United States Patent [19]
Konno

[11] Patent Number: 6,072,657
[45] Date of Patent: Jun. 6, 2000

[54] CARTRIDGE LIBRARY APPARATUS HAVING CELL SIDE WALL SPACING WHICH INCREASES TOWARDS THE CELL OPENING

[75] Inventor: Tamio Konno, Yamagata, Japan

[73] Assignee: NEC Corporation, Tokyo, Japan

[21] Appl. No.: 09/027,350

[22] Filed: Feb. 20, 1998

[30] Foreign Application Priority Data

Feb. 25, 1997 [JP] Japan .................................... 9-040505

[51] Int. Cl.⁷ ........................... G11B 15/68; G11B 33/04
[52] U.S. Cl. ........................... 360/92; 360/96.5; 360/77.2
[58] Field of Search ................... 360/92, 96.5; 369/77.2; 312/9.57, 9.63

[56] References Cited

U.S. PATENT DOCUMENTS

| | | | |
|---|---|---|---|
| 4,345,283 | 8/1982 | Maryschka | 360/96.6 |
| 5,513,053 | 4/1996 | Kurokawa | 360/96.5 |
| 5,652,682 | 7/1997 | Elliott | 360/92 |

*Primary Examiner*—George J. Letscher
*Attorney, Agent, or Firm*—Hayes, Soloway, Hennessey, Grossman & Hage PC

[57] ABSTRACT

There is provided a medium library apparatus including a plurality of cells each of which has an opening and into which a medium is loaded through the opening, each one of the cells having oppositely located first and second walls each having an outward inclination that a spacing between the first and second walls increases towards the opening, a handling device for loading the medium into and taking the medium out of the cell, the handling device including a projection for pushing the medium having been loaded in one of the cells towards a rear surface of the cell located oppositely to the opening to thereby rotate the medium in the cell so as to release the medium from latch means, a leaf spring for pushing the medium from one of the first and second walls towards the other when the medium has been loaded into one of the cells, a latch for latching the medium to the other of the first and second walls when the leaf spring causes the medium to make contact with the other of the first and second walls, and an access device for moving the handling device to a selected one of the cells. The above-mentioned medium library apparatus can load a medium such as a cartridge or a disc into or take the medium out of a selected cell without operating the handling device in complicated movements, but in simple forward and backward movement of the handling device.

28 Claims, 5 Drawing Sheets

CARTRIDGE LIBRARY APPARATUS HAVING CELL SIDE WALL SPACING WHICH INCREASES TOWARDS THE CELL OPENING

BACKGROUND OF THE INVENTION

1. Field of the Invention

The invention relates to a medium library apparatus, and more particularly to a medium library apparatus having a plurality of cells into each of which is loaded a medium. Herein, a medium means a cartridge containing a magnetic tape wound therein, a magnetic disc and so on.

2. Description of the Related Art

FIGS. 1A and 1B illustrate one of conventional cartridge library apparatuses suggested in Japanese Unexamined Patent Publication No. 2-81352. The suggested cartridge library apparatus is embodied as a library apparatus for loading a magnetic tape cartridge thereinto.

The cartridge library apparatus includes a plurality of shelves 1 each of which has oppositely located sidewalls to each of which a leaf spring 2 is connected. Each of the leaf springs 2 is designed to downwardly deform, and is formed at a distal end thereof with a projection 3 horizontally, inwardly extending from the each of the leaf springs 2. The projections 3 act as a latch by fitting into grooves (not illustrated) of a magnetic tape cartridge 4 having been loaded into the shelf 1.

When a magnetic tape cartridge 4 is loaded into a selected shelf 1 by means of an automatic handling equipment (not illustrated), the leaf springs 2 are downwardly deformed, and the magnetic tape cartridge 4 is loaded into the shelf 1 above the deformed leaf springs to thereby avoid the projections 3 from fitting into the grooves to thereby latch the magnetic tape cartridge 4. Thereafter, the magnetic tape cartridge 4 rests on a bottom surface of the shelf 1 by dead weight of itself. Then, the leaf springs 2 having been made to downwardly deform are allowed to return to their original shapes, resulting in that the projections 3 fit into the grooves of the magnetic tape cartridge 4. Thus, the magnetic tape cartridge 4 once having been loaded into the shelf 1 is prevented from leaving the shelf 1.

In accordance with the above-mentioned cartridge library apparatus, the magnetic tape cartridge 4 is automatically latched by the leaf springs 2. However, it is necessary to move the automatic handling equipment upwardly or downwardly in order to avoid the magnetic tape cartridge 4 from being latched or latch the magnetic tape cartridge 4. That is, the automatic handling equipment has to be moved upwardly or downwardly each time when the magnetic tape cartridge 4 is to be loaded into or taken out of the shelf 1.

Japanese Unexamined Patent Publication No. 6-162636 has suggested another cartridge library apparatus. FIG. 2 illustrates one of shelves 5 of the suggested cartridge library apparatus. The each of the shelves 5 is formed at a sidewall thereof and at an opening thereof with a stopper 6. The stopper 6 has a first portion 6a projecting inwardly of the shelf 5 and a second portion 6b projecting outwardly of the shelf 5. The stopper 6 is designed to rotate about a fulcrum 7 in directions indicated with arrows A and B. The second portion 6b of the stopper 6 is connected to a projecting portion 5a of the shelf 5 through a spring 8.

In operation, when a magnetic tape cartridge 9 is loaded into the shelf 5 by an automatic handling equipment (not illustrated), the stopper 6 is made to rotate in the direction A. Then, after the magnetic tape cartridge 9 has been completely loaded in the shelf 5, the stopper 6 returns to a position illustrated in FIG. 2 by a force of the spring 8. Thus, the stopper 6 prevents the magnetic tape cartridge 9 from being ejected out of the shelf 5. When the magnetic tape cartridge 9 is to be taken out of the shelf 5, the automatic handling equipment holds the magnetic tape cartridge 9, and then leaves the shelf 5. While the magnetic tape cartridge 9 is leaving the shelf 5, the stopper 6 is made to rotate in the direction B. After the magnetic tape cartridge 9 has left the shelf 5, the stopper 6 returns to a position illustrated in FIG. 2 by a force of the spring 8.

The above-mentioned Publication No. 6-162636 has suggested a cartridge library apparatus having a simpler structure than that of the cartridge library apparatus suggested in the firstly mentioned Publication. However, the cartridge library apparatus suggested in the Publication 6-162636 is accompanied with a problem that even after the magnetic film cartridge 9 has been once loaded in the shelf 5, the magnetic film cartridge 9 may be ejected out of the shelf 5, because the stopper 6 is designed to rotate in both the directions A and B.

Japanese Unexamined Utility Model Publication No. 61-6944 has suggested still another cartridge library apparatus. The suggested cartridge library apparatus includes a plurality of shelves into each of which a magnet tape cartridge is to be loaded and each of which has a bottom rotatable about one longitudinal edge thereof, and a driver means for driving the shelves between a first position where a bottom of the shelves are downwardly rotated and a second position where a bottom of the shelves are kept horizontally.

This cartridge library apparatus has a problem that each of shelves have to be designed to have a rotatable bottom, and that the cartridge library apparatus has to have the driver means for controlling the rotation of the shelves, both of which cause the cartridge library apparatus to be more complicated in structure and to operate in more complicated steps.

SUMMARY OF THE INVENTION

It is an object of the present invention to provide a medium library apparatus which is capable of loading a medium such as a cartridge or a disc into or taking the medium out of a selected cell without a complicated structure and complicated operation steps. It is also an object of the present invention to provide a method of operating the above-mentioned medium library apparatus.

In one aspect, there is provided a medium library apparatus including (a) at least one cell which has an opening and into which a medium is loaded through the opening, the cell including oppositely located first and second walls each having such an inclination that a spacing between the first and second walls increases towards the opening, (b) a handling device for loading the medium into and taking the medium out of the cell, (c) a pusher for pushing the medium from one of the first and second walls towards the other when the medium has been loaded into the cell, and (d) a latch for latching the medium to the other of the first and second walls when the pusher causes the medium to make contact with the other of the first and second walls.

When the medium library apparatus includes a plurality of cells, it is preferable that the medium library apparatus further includes an access device for moving the handling device to a selected one of the cells.

The first and second walls may have different inclinations. However, it is preferable that the first and second walls have the same inclination.

The pusher may be comprised of a spring extending from the one of the first and second walls of the cell. The spring may be a leaf spring, in which case, the leaf spring is preferably V-shaped in such a manner that an apex of "V" is directed to the other of the first and second walls, and the one of first and second walls of the cell is preferably formed with an opening through which a free end of the V-shaped leaf spring escapes outside the cell when the V-shaped leaf spring is compressed by the medium being loaded into the cell.

It is preferable that the latch means is designed to move out of place when the medium is rotated in a direction far away from the other of the first and second walls of the cell. For instance, the latch may include a projection formed at an inner surface of the other of the first and second walls of the cell, and a recess to which the projection is engagable and which is formed at an outer surface of the medium. It is preferable that the projection of the latch is shaped to be a triangle having a side extending from the other of the first and second walls, and an oblique side extending from the side towards the opening of the cell.

It is preferable that the handling device includes a pair of picker arms for interposing the medium at opposite surfaces of the medium therebetween.

The cell may be designed to receive the medium horizontally or vertically. Herein, the medium means a cartridge containing a magnetic tape wound therein, a disc and other containers similar to them.

There is further provided a medium library apparatus including (a) at least one cell which has an opening and into which a medium is loaded through the opening, the cell including oppositely located first and second walls each having such an inclination that a spacing between the first and second walls increases towards the opening, (b) a handling device for loading the medium into and taking the medium out of the cell, the handling device including a projection for pushing the medium having been loaded in the cell towards a rear surface of the cell located oppositely to the opening to thereby rotate the medium in the cell so as to release the medium from later mentioned latch, (c) a pusher for pushing the medium from one of the first and second walls towards the other when the medium has been loaded into the cell, and (d) a latch for latching the medium to the other of the first and second walls when the pusher causes the medium to make contact with the other of the first and second walls.

In another aspect of the invention, there is provided a method of loading a medium into a cell in a medium library apparatus including: at least one cell which has an opening and into which the medium is loaded through the opening, the cell including oppositely located first and second walls each having such an inclination that a spacing between the first and second walls increases towards the opening; and a pair of picker arms for interposing the medium therebetween, including the steps of (a) interposing the medium between the picker arms, (b) loading the medium with being interposed between the picker arms, (c) rotating the medium in the cell onto one of the first and second walls, and (d) latching the medium to the cell.

There is further provided a method of taking a medium out of a cell in a medium library apparatus including: at least one cell which has an opening and into which the medium is loaded through the opening, the cell including oppositely located first and second walls each having such an inclination that a spacing between the first and second walls increases towards the opening; and a pair of picker arms for interposing the medium therebetween, including the steps of (a) rotating the medium in a direction far away from one of the first and second walls of the cell with which the medium has made contact, to thereby release the medium from being latched, (b) interposing the medium between the picker arms, and (c) moving the picker arms out of the cell.

It is preferable that the medium is rotated in the step (a) by being pushed towards a rear surface of the cell located oppositely to the opening.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

A cartridge library apparatus in accordance with a preferred embodiment of the invention is explained hereinbelow with reference to FIGS. 3 and 4A to 4D. The cartridge library apparatus is embodied as a cartridge library apparatus for storing ½-inch magnetic tape cartridges therein.

Figure 1A:
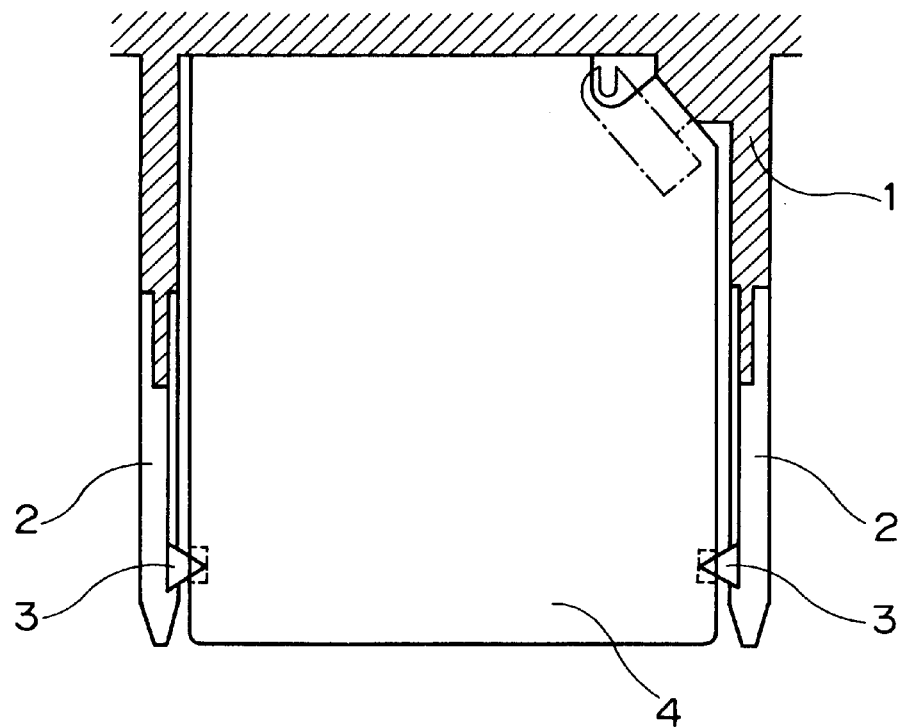
FIG. 1A is a plan view of a conventional cartridge library apparatus.
Figure 1B:
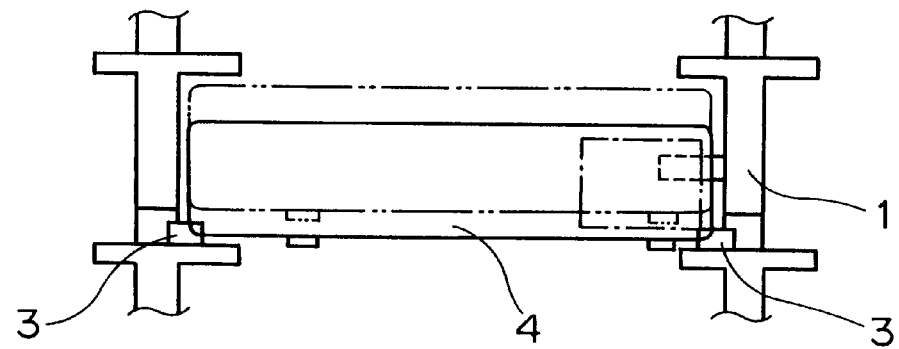
FIG. 1B is a side of the cartridge library apparatus illustrated in FIG. 1A.
Figure 2:
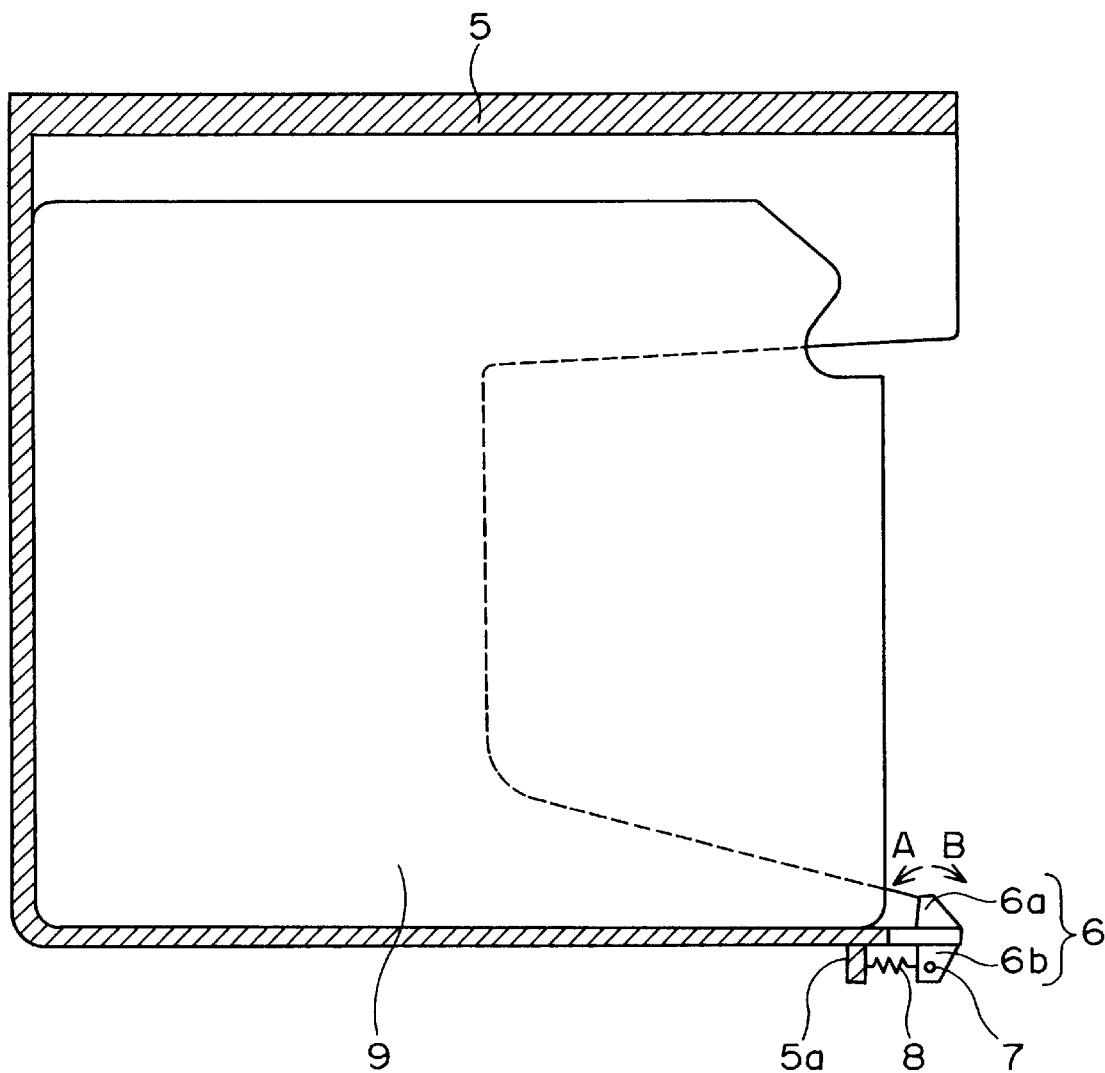
FIG. 2 is a plan view of another conventional cartridge library apparatus.
Figure 3:
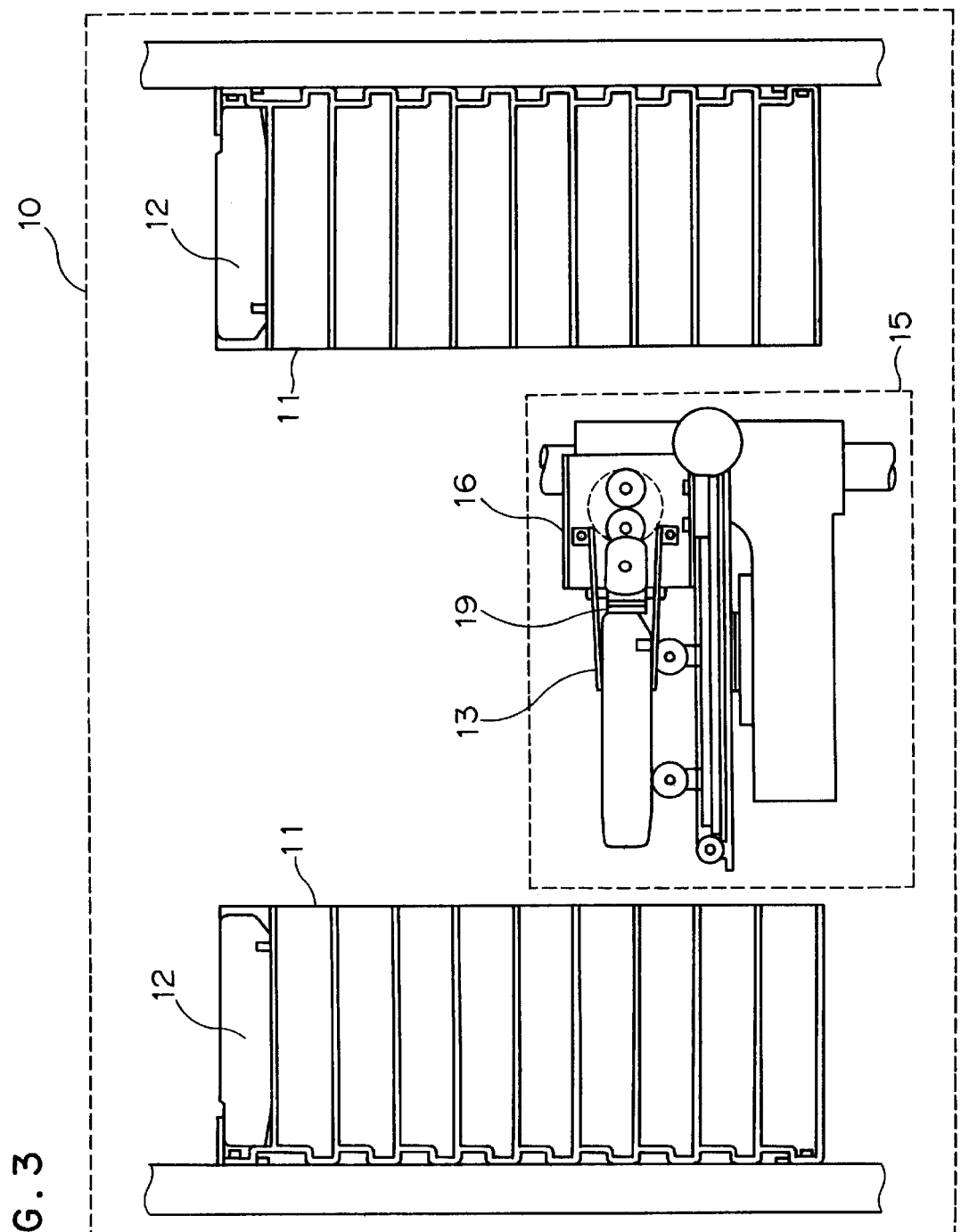
FIG. 3 is a schematic view illustrating a cartridge library apparatus in accordance with the first embodiment of the present invention.

With reference to FIG. 3, the cartridge library apparatus 10 includes a plurality of cells 11 and an access equipment 15 including a handling device 16 having a pair of picker arms 13 for interposing a cartridge 12 therebetween. Herein, what is meant by the term "cartridge" includes all types of container such as a cartridge containing a magnetic tape wound therein, a floppy disc, and any other similar containers. As illustrated in FIG. 3, the cells 11 are separated into several groups in each of which the cells 11 are vertically arranged. The access equipment 15 can ascend up or descend down to a desired elevation, and also can rotate by any degrees. Hence, the access equipment 15 can move to a selected one of the cells 11, and make the handling device 16 face the selected one of the cells 11.

Figure 4A:
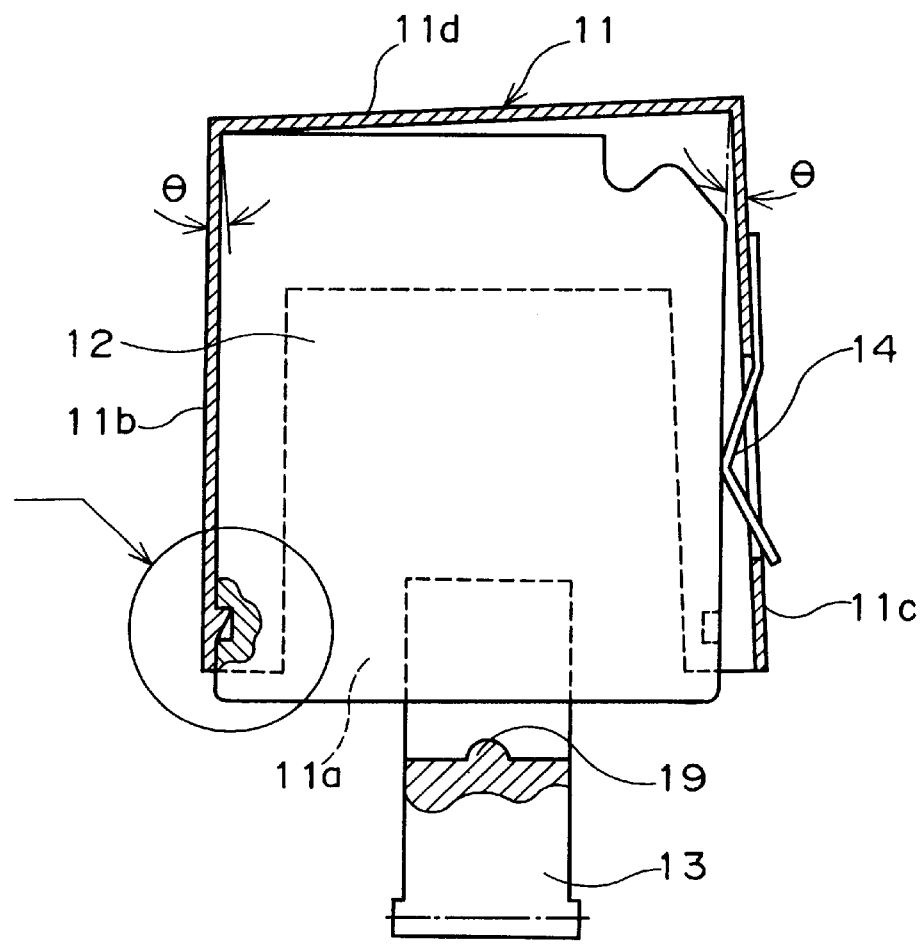
FIG. 4A is a plan view illustrating one of cells of the cartridge library apparatus in accordance with the first embodiment, into which a cartridge is loaded, with an upper wall of the cell removed away for clarity.

As illustrated in FIG. 4A, each of the cells 11 has an opening 11a through which the cartridge 12 is to be loaded into the cell 11. The cell 11 has a left sidewall 11b and a right sidewall 11c located in facing relation. The left and right sidewalls 11b and 11c are designed to have such an outward inclination θ that a spacing between the left and right sidewalls 11b and 11c increases towards the opening 11a. Though the left and right sidewalls 11b and 11c in the instant embodiment are designed to have the same outward inclination, it should be noted that the left and right sidewalls 11b and 11c may have different outward inclinations.

A V-shaped leaf spring 14 is fixed at one end thereof to an inner surface of the right sidewall 11c so that an apex of the shape "V" is directed to the left sidewall 11b. The right sidewall 11c is formed with an opening (not illustrated) through which a free end of the V-shaped leaf spring 14 can move outside the cell 11 when the V-shaped leaf spring 14 is compressed by the cartridge 12 being loaded into the cell 11, as mentioned later.

Figure 4B:
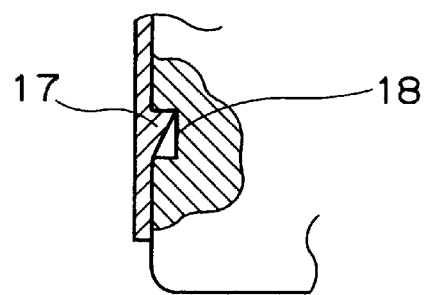
FIG. 4B is an enlarged view of an encircled portion in FIG. 4A.

As best illustrated in FIG. 4B, the left sidewall 11b is formed at inner surface thereof and in the vicinity of the opening 11a with a projection 17. The cartridge 12 is also formed at a sidewall thereof with a recess 18 into which the projection 17 is fittable. The projection 17 is fitted into the recess 18 of the cartridge 12 when the cartridge 12 is loaded into the cell 11 and then pushed onto the left sidewall 11b by the leaf spring 14. That is, the projection 17 and the recess 18 cooperate with each other to define latch means for latching the cartridge 12 in the cell 11. The projection 17 is shaped as a triangle having a side extending from the left sidewall 11b towards the right sidewall 11c, and an oblique side extending from the side towards the opening 11a of the cell 11. The recess 18 is shaped to be rectangular.

As mentioned later, the handling device 16 drives the picker arms 13 to thereby load the cartridge 12 into and take the cartridge 12 out of the cell 11. The handling device 6 includes a projection 19 between the picker arms 13 for pushing the cartridge 12 having already been loaded in the cell 11 towards a rear surface 11d of the cell 11 to thereby rotate the cartridge 12, as mentioned later.

Hereinbelow is explained an operation of the cartridge library apparatus 10 having the structure as mentioned above.

The cartridge 12 is loaded into a selected one of the cells 11 as follows.

The access equipment 15 is first disposed below the column of the cells 11. The picker arms 13 receive and interpose the cartridge 12 therebetween there. Then, the access equipment 15 starts ascending to a desired elevation, and rotates by any degrees, if necessary, to thereby cause the cartridge 12 interposed between the picker arms 13 to face the opening 11a of the selected cell 11 into which the cartridge 12 is to be loaded.

Then, the picker arms 13 move forward into the cell 11 with the cartridge 12 being held therebetween until the cartridge 12 comes into abutment with the rear surface 11d of the cell 11. While the cartridge 12 is being loaded into the cell 11, the cartridge 12 keeps in contact with the V-shaped leaf spring 14. As a result, the V-shaped leaf spring 14 is compressed, and hence the free end of the leaf spring 14 moves outside the cell through the opening (not illustrated) formed at the right sidewall 11c.

When the cartridge 12 comes into abutment with the rear surface 11d of the cell 11, the picker arms 13 are opened to thereby release the cartridge 12 therefrom. Then, the picker arms 13 move backward, leaves the cell 11, and returns to the original position. Then, the access equipment 15 descends down to the position where it used to be.

The cartridge 12 having been released from the picker arms 13 is pushed by the V-shaped leaf spring 14 towards the left sidewall 11b. Thus, the cartridge 12 is forced onto an inner surface of the left sidewall 11b, resulting in that the triangular projection 17 is fitted into the recess 18 of the cartridge 12, as illustrated in FIG. 4B. Thus, the cartridge 12 is latched in the cell, as illustrated in FIG. 4A, and hence is prevented from being ejected out of the cell 11. It should be noted that the cartridge 12 makes contact only with the left sidewall 11b and does not make contact with the rear surface 11d of the cell in this state, as illustrated in FIG. 4A, and that the cartridge 12 is slightly inclined because the cartridge 12 makes close contact with the left sidewall 11b having the inclination θ.

The thus loaded cartridge 12 is taken out of the cell 11 as follows.

Figure 4C:
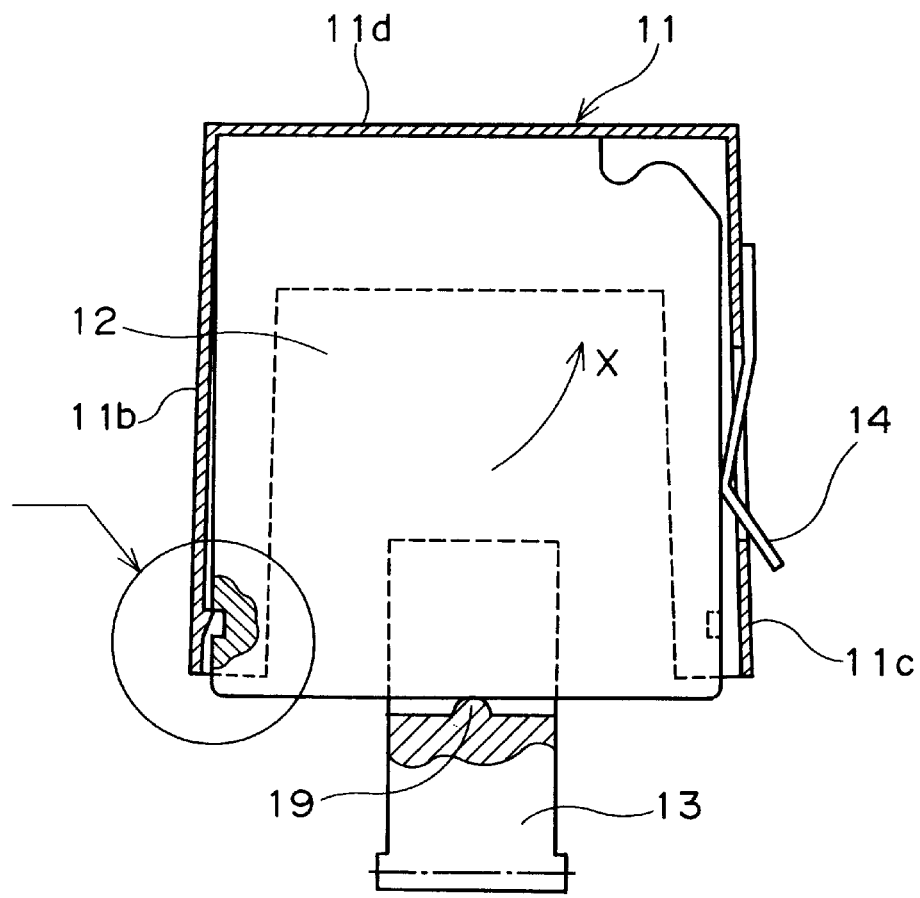
FIG. 4C is a plan view illustrating one of cells of the cartridge library apparatus in accordance with the first embodiment, out of which a cartridge is to be taken away, with an upper wall of the cell removed away for clarity.

The access equipment 15 starts ascending to a desired elevation, and rotates by any degrees, if necessary, to thereby face the opening 11a of the cell 11 into which the cartridge 12 has been loaded. Then, the picker arms 13 are move open, and move forward into the cell 11 while being kept open. Then, as illustrated in FIG. 4C, the projection 19 formed between the picker arms 13 comes into abutment with the cartridge 12 loaded in the cell 11. The picker arms 13 move further forward to thereby push the cartridge 12 with the projection 13 towards the rear surface 11d of the cell 11. If the cartridge 12 is continued to be pushed towards the rear surface 11d of the cell 11 after the cartridge 12 first contacts the rear surface 11d, the cartridge 12 rotates in the direction indicated with an arrow X. That is, the cartridge 12 leaves the left sidewall 11b, and makes contact with the rear surface 11d of the cell 11. In other words, a positional relation between the cartridge 12 and the cell 11 is changed from the relation illustrated in FIG. 4A to the relation illustrated in FIG. 4C.

Figure 4D:
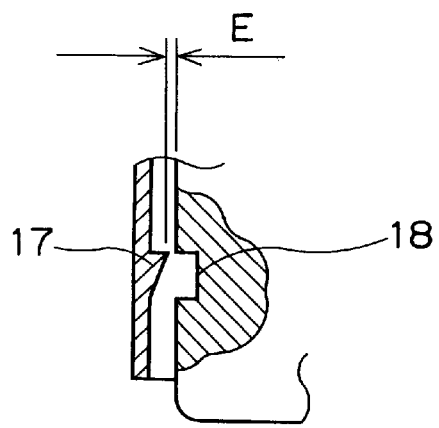
FIG. 4D is an enlarged view of an encircled portion in FIG. 4C.

As a result, the V-shaped leaf spring 14 is deformed with the free end thereof moving outside the cell 11 through the opening (not illustrated) of the right sidewall 11c. In addition, the projection 17 moves out of engagement with the recess 18, as illustrated in FIG. 4D, resulting in that the cartridge 12 is released from being latched. Thus, as illustrated in FIG. 4D, the cartridge 12 is moved away from the left sidewall 11b by a gap E.

Thus, the cartridge 12 is kept non-inclined by being compressed onto the rear surface 11d of the cell 11. Then, the picker arms 13 are closed to thereby interpose the cartridge 12 therebetween. The picker arms 13 starts moving backward into the handling device 16 with the cartridge 12 being interposed therebetween. Thereafter, the picker arms 13 are moved open again to thereby release the cartridge 12, which is in turn received in the handling device 16. Thus, the cartridge 12 is taken out of the cell 11.

In accordance with the above-mentioned embodiment, it is possible to load a medium such as a cartridge or a disc into or take the medium out of a selected cell without complicated operation of the cartridge library apparatus 10, but in single forward and backward movement of the picker arms 13.

In the above-mentioned embodiment, the cells 11 are vertically arranged so that the cartridges 12 are horizontally stored therein. However, it should be noted that the cells 11 might be horizontally arranged so that the cartridges 12 are vertically stored therein.

Though the present invention is embodied in the above-mentioned embodiment as a cartridge library apparatus for storing ½-inch magnetic tape cartridges therein, it should be noted that the present invention may be applied to a library apparatus for storing any other mediums such as a floppy disc, a video-tape cartridge, a CD-ROM cartridge, and other similar cartridges.

The present invention provides advantages as follows.

First, it is possible to simplify the operation for loading the cartridge into the cell 11. The reason is that since the cartridge 12 is latched by being pushed by the leaf spring 14, the cartridge 12 can be released from being latched by applying a force greater than the force of the leaf spring 14 to the cartridge 12. Thus, the cartridge 12 can be loaded into or taken out of the cell 11 in simple operation such as the forward and backward movements of the picker arms 13.

Secondly, it is possible to readily latch and release the cartridge 12 with a simple structure including the leaf spring 14, the latch means 17 and 18, and the projection 19. Specifically, the cartridge 12 can be latched merely by pushing the cartridge 12 onto the left sidewall 11b having the inclination, with the leaf spring 14, and the cartridge 12 can be released from being latched merely by pushing the cartridge 12 towards the rear surface 11d of the cell 11 with the projection 19 formed between the picker arms 13.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-40505 filed on Feb. 25, 1997 including specification, claims, drawings and summary is incorporated herein by reference in its entirety.

What is claimed is:

1. A medium library apparatus comprising:
    (a) at least one cell which has an opening and into which a medium is loaded through said opening, said cell including oppositely located first and second side walls extending from a back wall, each side wall having an outward inclination that a spacing between said first and second side walls increase from the back wall towards said opening;
    (b) a handling device for loading said medium into and taking said medium out of said cell;
    (c) a pusher spring extending from one of said first and second side walls of said cell for pushing said medium from said one of said first and second side walls into contact with the other side wall when said medium has been loaded into said cell; and
    (d) a latch for latching said medium to the other of said first and second side walls when said pusher causes said medium to make contact with the other of said first and second side walls.

2. The medium library apparatus as set forth in claim 1, wherein said medium library apparatus includes a plurality of cells, and further includes an access device for moving said handling device to a selected one of said cells.

3. The medium library apparatus as set forth in claim 1, wherein said first and second side walls have the same outward inclination.

4. The medium library apparatus as set forth in claim 1, wherein said spring is a leaf spring.

5. The medium library apparatus as set forth in claim 4, wherein said leaf spring is V-shaped in such a manner that an apex of "V" is directed to the other of said first and second side walls, and wherein said one of first and second side walls of said cell is formed with an opening through which a free end of said V-shaped leaf spring moves outside said cell when said V-shaped leaf spring is compressed by said medium being loaded into said cell.

6. The medium library apparatus as set forth in claim 1, wherein said latch is designed to move out of place when said medium is rotated in a direction far away from the other of said first and second side walls of said cell.

7. The medium library apparatus as set forth in claim 6, wherein said latch is comprised of a projection formed at an inner surface of the other of said first and second side walls of said cell, and a recess to which said projection is engagable and which is formed at an outer surface of said medium.

8. The medium library apparatus as set forth in claim 7, wherein said projection of said latch is shaped to be a triangle having a side extending from the other of said first and second side walls, and an oblique side extending from said side towards said opening of said cell.

9. The medium library apparatus as set forth in claim 1, wherein said handling device includes a pair of picker arms for interposing said medium at opposite surfaces of said medium therebetween.

10. The medium library apparatus as set forth in claim 1, wherein said cell is designed to horizontally receive said medium.

11. The medium library apparatus as set forth in claim 1, wherein said cell is designed to vertically receive said medium.

12. The medium library apparatus as set forth in claim 1, wherein said medium is a cartridge containing a magnetic tape wound therein.

13. The medium library apparatus as set forth in claim 1, wherein said medium is a disc.

14. A medium library apparatus comprising:
    (a) at least one cell which has an opening and into which a medium is loaded through said opening, said cell including oppositely located first and second side walls extending from a back wall, each having an outward inclination that a spacing between said first and second side walls increases towards said opening;
    (b) a handling device for loading said medium into and taking said medium out of said cell, said handling device including a projection for pushing said medium having been loaded in said cell towards a rear surface of said cell located oppositely to said opening to thereby rotate said medium in said cell so as to release said medium from later mentioned latch means;
    (c) a pushing spring extending from one of said first and second walls of said cell for pushing said medium from said one of said first and second side walls into contact with the other side wall when said medium has been loaded into said cell; and
    (d) a latch for latching said medium to the other of said first and second side walls when said pushing spring causes said medium to make contact with the other of said first and second side walls.

15. The medium library apparatus as set forth in claim 14, wherein said medium library apparatus includes a plurality of cells, and further includes an access for moving said handling device to a selected one of said cells.

16. The medium library apparatus as set forth in claim 14, wherein said first and second side walls have the same outward inclination.

17. The medium library apparatus as set forth in claim 14, wherein said spring is a leaf spring.

18. The medium library apparatus as set forth in claim 17, wherein said leaf spring is V-shaped in such a manner that an apex of "V" is directed to the other of said first and second side walls, and wherein said one of first and second side walls of said cell is formed with an opening through which a free end of said V-shaped leaf spring escapes outside said cell when said V-shaped leaf spring is compressed by said medium being loaded into said cell.

19. The medium library apparatus as set forth in claim 14, wherein said latch is designed to move out of place when said medium is rotated in a direction far away from the other of said first and second side walls of said cell.

20. The medium library apparatus as set forth in claim 19, wherein said latch is comprised of a projection formed at an inner surface of the other of said first and second side walls of said cell, and a recess to which said projection is engagable and which is formed at an outer surface of said medium.

21. The medium library apparatus as set forth in claim 20, wherein said projection of said latch is shaped to be a triangle having a side extending from the other of said first and second side walls, and an oblique side extending from said side towards said opening of said cell.

22. The medium library apparatus as set forth in claim 14, wherein said handling device includes a pair of picker arms for interposing said medium at opposite surfaces of said medium therebetween.

23. The medium library apparatus as set forth in claim 14, wherein said cell is designed to horizontally receive said medium.

24. The medium library apparatus as set forth in claim 14, wherein said cell is designed to vertically receive said medium.

25. The medium library apparatus as set forth in claim 14, wherein said medium is a cartridge containing a magnetic tape wound therein.

26. The medium library apparatus as set forth in claim 14, wherein said medium is a disc.

27. A method of loading a medium into a cell in a medium library apparatus including: at least one cell which has an opening and into which said medium is loaded through said opening, said cell including oppositely located first and second side walls extending from a back wall each side wall having an outward inclination that a spacing between said first and second side walls increases towards said opening; and a pair of picker arms for interposing said medium therebetween, comprising the steps of:
   (a) interposing said medium between said picker arms;
   (b) loading said medium with being interposed between said picker arms;
   (c) rotating said medium in said cell by pushing said medium from one of said first and second side walls by means of a spring mounted on said one side wall, into contact with the other side wall; and
   (d) latching said medium to said cell in contact with said other side wall.

28. A method of taking a medium out of a cell in a medium library apparatus including: at least one cell which has an opening and into which said medium is loaded through said opening, said cell including oppositely located first and second side walls extending from a back wall, each side wall having an outward inclination that a spacing between said first and second side walls increases towards said opening; and a pair of picker arms for interposing said medium therebetween, wherein said medium is held in contact with one of said first and second side walls of said cell by means of a spring mounted on said one side wall, and latched to said cell by means of a latch mounted on said other side wall, comprising the steps of:
   (a) rotating said medium in a direction away from said, latch carrying wall by pushing on said medium in a direction towards a rear surface of said cell located oppositely to said opening, to thereby release said medium from being latched;
   (b) interposing said medium between said picker arms; and
   (c) moving said picker arms out of said cell.

* * * * *